US010252274B2

(12) United States Patent
Gaudreault

(10) Patent No.: US 10,252,274 B2
(45) Date of Patent: *Apr. 9, 2019

(54) APPARATUS AND METHOD FOR CHIPPING TREE BRANCHES AND THE LIKE AND BALING WOOD CHIPS FORMED DURING SUCH CHIPPING ACTIVITIES

(71) Applicant: Daniel Gaudreault, Summerville, SC (US)

(72) Inventor: Daniel Gaudreault, Summerville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,802

(22) Filed: Apr. 25, 2017

(65) Prior Publication Data

US 2017/0225174 A1 Aug. 10, 2017

Related U.S. Application Data

(63) Continuation of application No. 13/514,810, filed as application No. PCT/US2010/059697 on Dec. 9, 2010, now Pat. No. 9,736,986.

(Continued)

(51) Int. Cl.
*B02C 21/02* (2006.01)
*A01F 15/07* (2006.01)
(Continued)

(52) U.S. Cl.
CPC .............. *B02C 21/02* (2013.01); *A01F 15/07* (2013.01); *A01F 15/101* (2013.01); *B02C 23/00* (2013.01);
(Continued)

(58) Field of Classification Search
CPC ...... B27L 11/002; B02C 21/02; B02C 21/026
See application file for complete search history.

(56) References Cited

U.S. PATENT DOCUMENTS 3,483,688 A * 12/1969 Hollyday ............... A01D 43/08
474/63
4,044,525 A * 8/1977 Forsgren ................. B27L 11/02
141/67

(Continued)

FOREIGN PATENT DOCUMENTS

EP        1090543 A1    4/2001
EP        1842417 A1   10/2007
JP     2003-00049 A     1/2003

*Primary Examiner* — Matthew Katcoff
(74) *Attorney, Agent, or Firm* — Southeast IP Group, LLC.; Thomas L. Moses

(57) ABSTRACT

The present invention relates generally to wood chippers and baling machines and methods of operation therefor, and more specifically, to an apparatus and a method for chipping tree branches and the like and baling wood chips formed from such chipping activities. The apparatus includes a chipper assembly having a chipping mechanism operable to reduce the trimmed branches to wood chips. Also provided is a bale forming assembly operatively connected to the chipper assembly. The bale forming assembly has a housing and a baling mechanism contained within an interior space of the housing. The housing has an opening defined therein for receiving wood chips from the chipper assembly. The opening provides access to the interior space of the housing. The baling mechanism is operable to form a bale from the wood chips produced by the chipper assembly.

3 Claims, 3 Drawing Sheets

Related U.S. Application Data

(60) Provisional application No. 61/285,042, filed on Dec. 9, 2009.

(51) Int. Cl.
*B27L 11/02* (2006.01)
*A01F 15/10* (2006.01)
*B02C 23/00* (2006.01)

(52) U.S. Cl.
CPC ......... *B27L 11/02* (2013.01); *A01F 2015/077* (2013.01); *A01F 2015/0795* (2013.01); *A01F 2015/103* (2013.01)

(56) References Cited

U.S. PATENT DOCUMENTS

| | | | | |
|---|---|---|---|---|
| 4,550,553 | A * | 11/1985 | Gaither | B65B 9/15 53/552 |
| 5,042,730 | A * | 8/1991 | Hundt | B02C 18/143 144/176 |
| 5,137,219 | A * | 8/1992 | Morey | B02C 18/22 144/176 |
| 5,205,496 | A | 4/1993 | O'Donnell et al. | |
| 2006/0086419 | A1* | 4/2006 | Aikins | A01G 3/002 144/162.1 |
| 2006/0108463 | A1* | 5/2006 | Gross | A01G 3/002 241/101.78 |
| 2009/0014567 | A1* | 1/2009 | Leonardi | A01G 23/067 241/280 |

\* cited by examiner

APPARATUS AND METHOD FOR CHIPPING TREE BRANCHES AND THE LIKE AND BALING WOOD CHIPS FORMED DURING SUCH CHIPPING ACTIVITIES

CROSS-REFERENCE TO RELATED APPLICATIONS

The present application is a continuation of U.S. application Ser. No. 13/514,810, entitled APPARATUS AND METHOD FOR CHIPPING TREE BRANCHES AND THE LIKE AND BALING WOOD CHIPS FROM SUCH CHIPPING ACTIVITIES, filed on Sep. 26, 2012, which is a National Stage Entry of U.S. PCT Application Number PCT/US2010/059697, entitled APPARATUS AND METHOD FOR CHIPPING TREE BRANCHES AND THE LIKE AND BALING WOOD CHIPS FROM SUCH CHIPPING ACTIVITIES, filed on Dec. 9, 2010, which is a non-provisional application of U.S. Application Ser. No. 61/285,042, entitled APPARATUS AND METHOD FOR CHIPPING TREE BRANCHES AND THE LIKE AND BALING WOOD CHIPS FROM SUCH CHIPPING ACTIVITIES, filed on Dec. 9, 2009. All of the foregoing applications are hereby incorporated by reference in their entireties.

FIELD OF THE INVENTION

The present invention relates generally to wood chippers and baling machines and methods of operation therefor, and more specifically, to an apparatus and a method of chipping tree branches and the like and baling wood chips formed from such chipping activities.

BACKGROUND OF THE INVENTION

Landscapers and/or arborists are often called upon to prune trees whose branches are diseases or are growing in such away that they interfere with, or otherwise pose a threat to, a house or other structure, or the proper functioning of public utility lines (e.g. power lines or telephone lines). In a typical pruning operation, a worker is lifted by a bucket truck to the area in need of trimming. Using a chainsaw-like tool mounted on a pole, the worker trims the problem branches from the tree. The trimmed branches are collected on the ground until the pruning job is completed, pending disposal. Disposal typically involved feeding the branches and/or brush into a wood chipper to reduce the branches and brush to wood chips.

One type of conventional wood chipper has an intake hopper, a chipper assembly for shredding the brush and a chute and blower assembly. The intake hopper is configured at one end to receive the branches to be chipped. At the opposite end thereof, the intake hopper communicates with the chipper assembly. The chipper assembly includes two opposed, counter-rotating discs or rollers which carry knives or teeth on their respective outer surfaces for chipping the brush. Located downstream of the chipper assembly, is the chute and blower assembly. The blower assembly is adapted to draw the wood chips from the chipper assembly and propel them through the chute. The orientation of the chute is adjustable so as to allow the wood chips to be discharged in a desired direction.

It is common practice in the field of tree trimming to have the chute of the wood chipper discharge the recently-formed wood chips into the loading bed of a transport truck. Once the transport truck is fully loaded, the wood chips are carted away from the work site. Often, the wood chips are treated like a waste by-product and taken to a landfill and discarded.

There are several drawbacks associated with this method of disposal. The wood chipper cannot be operated without a transport truck in place to collect the wood chips being discharged. When a large tree has been felled and is being chipped, the transport truck may become filled before the chipping operation has been completed. Under such circumstances, the transport truck must leave the work site to be unloaded. During that time, the wood chipper remains idle pending the return of the transport truck. This tends to result in loss productivity and delays and tends to increase the overall cost of the pruning operation.

From an environmental perspective, the disposal of wood chips at a landfill site is not environmentally-friendly and is a very poor use of resources. The wood chips constitute valuable biomass which could be used as fuel. By burying the wood chips in a landfill costs are incurred, thereby making the pruning operation more expensive. Moreover, the disposal of wood chips in this manner tends to very inefficient use of space at a landfill.

In light of the foregoing, it would be advantageous to have an apparatus and method in which could allow wood chips generated from tree trimming or pruning activities to be relatively easily, recovered, collected, stored, and transported for use so as to minimize wastage of such wood chips and enhance utilization of natural resources

SUMMARY OF THE INVENTION

In accordance with one embodiment of the present invention, there is provided and apparatus for reducing trimmed branches to wood chips and for forming a bale from the wood chips produced. The apparatus includes a chipper assembly having a chipping mechanism operable to reduce the trimmed branches to wood chips. Also provided is a bale forming assembly operatively connected to the chipper assembly. The bale forming assembly has a housing and a baling mechanism contained within an interior space of the housing. The housing has an opening defined therein for receiving wood chips from the chipper assembly. The opening provides access to the interior space of the housing. The baling mechanism, is operable to form a bale form from the wood chips produced by the chipper assembly.

In accordance with another embodiment of the present invention, there is provided a method for reducing trimmed branches to wood chips and for forming a bale from the wood chips produced. The method includes providing a chipper assembly having a chipping mechanism, operable to reduce the trimmed branches to wood chips. Also provided is bale forming assembly having a housing and a baling mechanism contained within an interior space of the housing. The housing has an opening defined therein for receiving chips from the chipper assembly. The opening provides access to the interior space of the housing. The baling mechanism is operable to form a bale from the chips produced by the chipper assembly. Additional steps of the method include: feeding the trimmed branches so as to reduce the trimmed branches to wood chips; discharging the wood chips produced from the chipping mechanism and conveying the wood chips into the interior space of the housing; and urging the baling mechanism to act upon the wood chips so as to form a bale from the wood chips.

In accordance with yet another embodiment of the present invention, there is provided an apparatus for reducing material to chips and for forming a bale from the chips produced. The apparatus includes a chipper assembly having a chipping mechanism operable to reduce the materials to chips. Also provided is a bale forming assembly operatively connected to the chipper assembly. The bale forming assembly has a housing and a baling mechanism contained within an interior space of the housing. The baling mechanism is operable to form a bale from the chips produced by the chipper assembly.

In accordance with still another embodiment of the present invention, there is provided a method for reducing material to chips and for forming a bale from the chips produced. The method includes providing a chipper assembly having a chipping mechanism operable to reduce the materials to chip. Also provided is a bale forming assembly operatively connected to the chipper assembly. The bale forming assembly has a housing and baling mechanism contained within an interior space of the housing. The housing has an opening defined therein for receiving chips from the chipper assembly. The method further includes the steps of: feeding the material to be reduced into the chipping mechanism; urging the chipping mechanism to act upon the material so as to reduce the material to chips; discharging the chips produced from the chipping mechanism and conveying the chips into the interior space of the housing; and urging the baling mechanism to act upon the chips so as to form a bale from the chips.

BRIEF DESCRIPTION OF THE DRAWINGS

The embodiments of the present invention shall be more clearly understood with reference to the following detailed description of the embodiments of the invention taken in conjunction with the accompanying drawing, in which.

DETAILED DESCRIPTION OF THE EMBODIMENTS OF THE INVENTION

Figure 1:
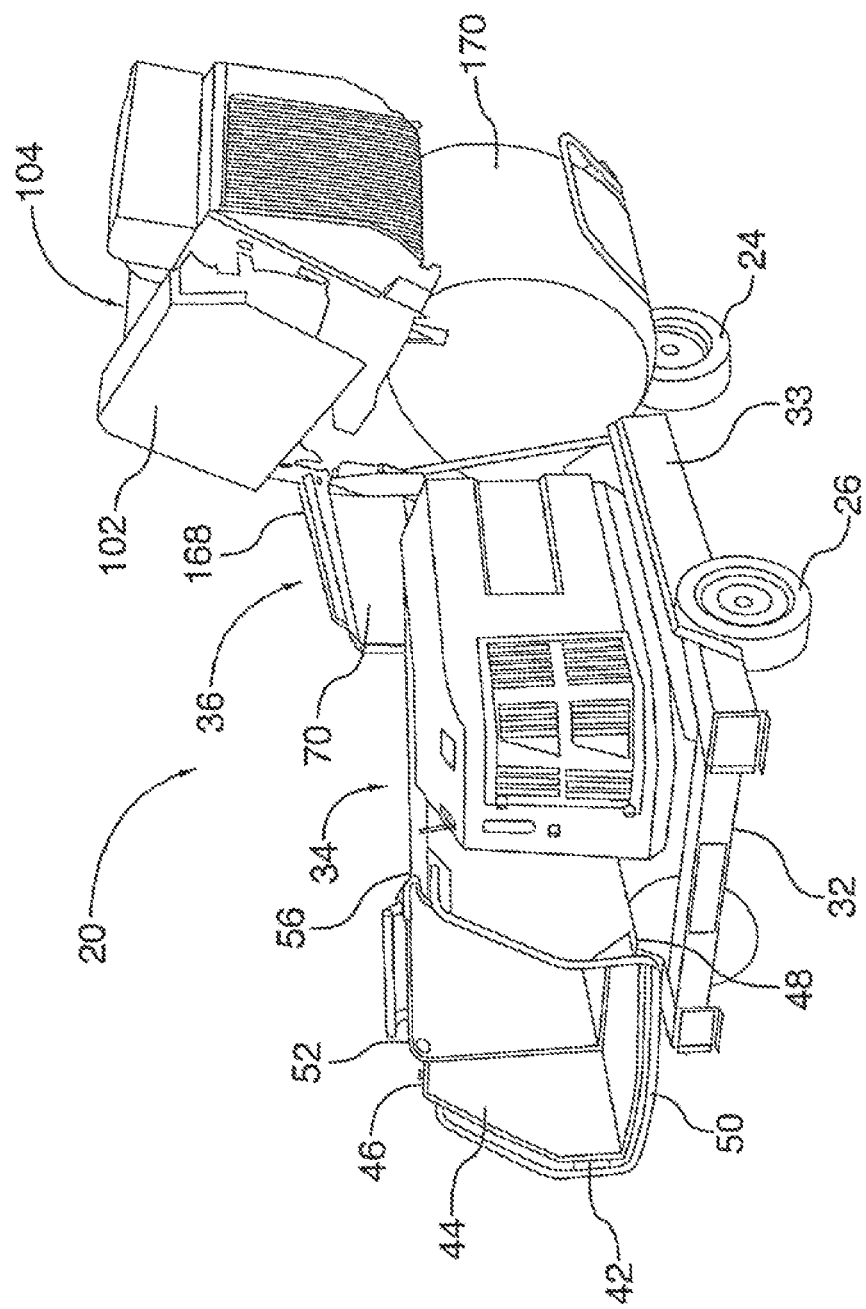
FIG. 1 is a photograph of an apparatus for chipping tree branches and the like and baling wood chips formed during such chipping activities according to an embodiment of the present invention.

The description which follows, and the embodiments described therein are provided by way of illustration of an example, or examples of particular embodiments of principles and aspects of the present invention. These examples are provided for the purposed of explanation and not of limitation, of those principles of the invention. In the description that follows, like parts are marked throughout the specification and the drawings with the same respective reference numerals.

Figure 2:
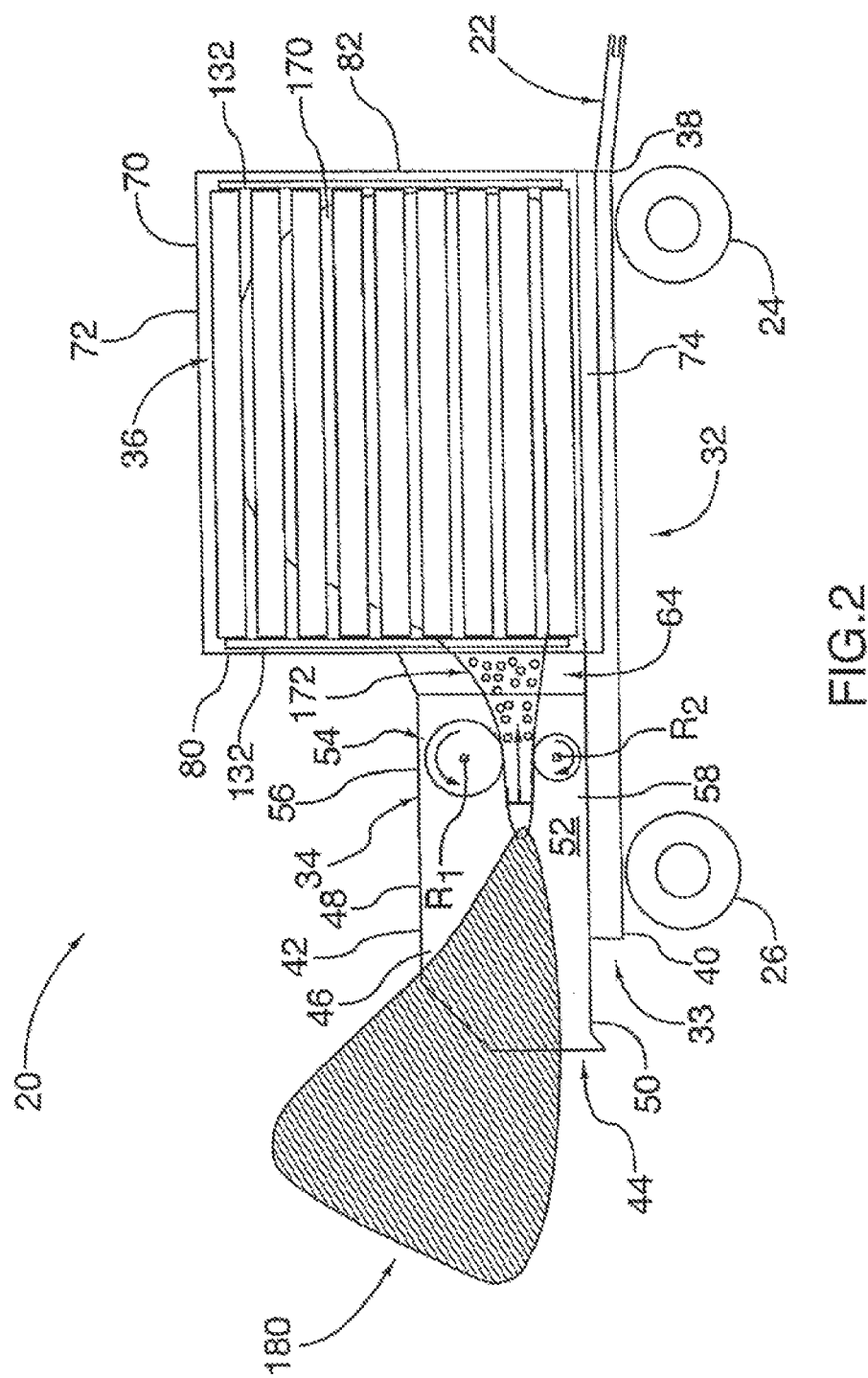
FIG. 2 a side elevation view of a conceptual version of the chipping and wood chip baling apparatus of FIG. 1 with a side panel of the chipper assembly removed to reveal details of the chipping mechanism therein and a side panel of the bale forming assembly removed to reveal details of the baling mechanism therein.

Referring to FIGS. 1 and 2, there is shown an apparatus for chipping tree branches or brush and forming bales of wood chips, generally designated with reference numeral 20. The chipping and bale forming apparatus 20 may be of the type attached to the rear of such vehicle, such as cube van, pick-up truck or the like by way of tow bar 22. The chipping and bale forming apparatus 20 is supported on front and rear wheels 24 and 26 for rolling motion on the ground. In this specification, front and rear direction indications are given with respect to the normal forward direction of the towing vehicle and apparatus 20 indicated by the arrow 28 in FIG. 2.

The chipping and bale forming apparatus 20 includes a chassis 32 having a frame 33 on which is supported a chipper assembly 34 and a bale forming assembly 36. The chipper assembly 34 is disposed at the rear end 40 of the chassis 32 while the bale forming assembly 36 is arranged next to the chipper assembly 34 at the front end 38 of the chassis 32. In this embodiment, the chipper assembly 34 and the bale forming assembly 36 share a common chassis, are physically connected to each other and are operable to work together to ultimately produce bales of wood chips.

As best shown in FIG. 1, the chipper assembly 34 has an intake hopper 42 provided with a large opening 44 for receiving the material to be chipped. The opening 44 is bound by a pair of opposed side walls 46, and a bottom wall 50 extending between the sidewalls 46 and 48. A short distance up from the bottom wall 50, the side walls 46 and 48 are truncated and extend upwardly at an acute angle. Inwardly of the opening 44, is a first feeder passageway 52 which leads to, and communicates with, a chipping mechanism 54.

The chipping mechanism 54 includes a housing 56 which supports between its sidewalls 58 two horizontally extending chipper rollers—a first chipper roller 60 and a second chipper roller 62. The first chipper roller 60 is carried higher off the ground that the second chipper roller 62. Each chipper roller 60, 62 is rotatable about a rotational axis $R_1$, $R_2$, respectively. As shown in FIG. 2, the rotational axes $R_1$ and $R_2$ lie in a substantially vertical plane. In this embodiment, when the chipper mechanism 54 is actuated, the first chipper roller 60 is urged to rotate counterclockwise, while the second chipper roller 62 is caused to rotate in the opposite, clockwise direction (see FIG. 2). The counter-rotation of the chipper rollers 60 and 62 in this manner causes the material to be chipped to be drawn into the chipper mechanism 54 in a feed direction F. It will be appreciated that the chipper mechanism 54 may be actuated to rotate the chipper rollers 60 and 62 in opposite directions (clockwise and counterclockwise, respectively) to allow material inserted into the chipper assembly 34 to travel in reverse in a direction opposite to the feed direction F.

As FIG. 2 provides merely a conceptual view of the chipper assembly 34, the bearing assemblies supporting the chipper rollers and the drive assemblies (including motor and drive belt arrangements) for driving rotation of the chipper rollers have been omitted from the drawings and are not shown.

In this embodiment, the upper chipper roller 60 has a larger diameter than the lower chipper roller 62. However, this need not be the case in every application. In an another embodiment, the upper and lower chipper rollers may be the same size. Alternatively, the lower chipper roller may be fabricated with a larger diameter than the upper chipper roller. Each chipper roller 60 and 62 carries on its outer surface a plurality of knives or cutting teeth (not shown) for reducing the material to be chipped to wood chips. The nip of the chipper rollers 60 and 62 may be adjusted to produce wood chips of a desired size.

While the chipper assembly 34 in this embodiment takes the form of a pair of counter-rotating horizontal chipper rollers, it will be appreciated that in alternative embodiments other types of chipper assemblies could be used to similar advantage. For instance, in one alternative chipper assembly, a pair of vertically oriented, counter-rotating chipper rollers could be used to similar advantage.

Disposed rearward of the chipper mechanism 54 is a second feeder passageway 64 that connects the chipper assembly 34 to the bale forming assembly 36. When the chipping and bale forming apparatus 20 is operating, the feeder passageway 64 allows wood chips produced by the chipper assembly 34 to be introduced or fed into the bale forming assembly 36 so that the wood chips may be gathered or assembled into bales.

In this embodiment, the wood chips are urged to travel into the bale forming assembly 36 by the propulsive force generated by the counter-rotating chipper rollers 60 and 62. Given the proximity of the chipper mechanism 34 to the bale forming assembly 34 and the magnitude of the propulsive force, no dedicated conveying means are required. It will thus be appreciated, that the chipper mechanism 54 in this embodiment carries out a dual function—it reduces the material to be chipped to wood chips while simultaneously conveying the resultant wood chips in to the bale forming apparatus 36. However, in alternative embodiments, the chipping and baling apparatus could be provided with a blower, a conveyor assembly, or other similar conveying means disposed in the passageway intermediate the chipper mechanism and the bale forming assembly, to encourage movement of the wood chips into the bale forming assembly.

Figure 3:
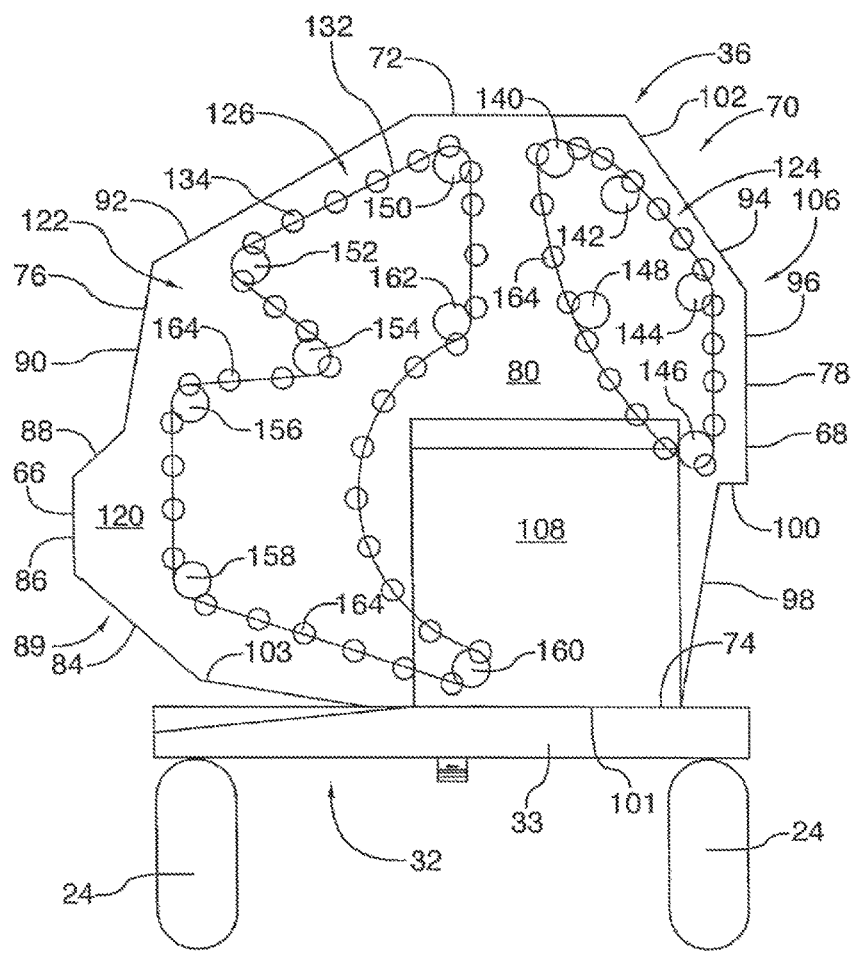
FIG. 3 is a cross-sectional view of the bale forming assembly shown in FIG. 2 taken along the section "3-3".

With reference to FIGS. 1, 2 and 3. The bale forming assembly 36 is now described in greater detail. The bale forming apparatus 36 has a housing 70 which extends longitudinally between first and second ends 66 and 68. The housing 70 is defined by a top panel 72, a bottom panel 74, first and second panels 76 and 78 which join the top panel 72 to the bottom panel 74, and a pair of opposed sidewalls 80 and 82 which extend between the top and bottom panels 72 and 74 and the first and second panels 76 and 78. Both the first and second panels 76 and 78 have generally irregular profiles (as best shown in FIG. 2) which are defined by multiple panel portions.

The first panel 76 has a first angled panel portion 84, a relatively short vertically extending panel portion 86, a third mildly sloped panel portion 88, a fourth relatively steeply inclined panel portion 90, and a fifth mildly sloped panel portion 92. The first panel portion 84 extends upwardly from the bottom panel 74 toward the first end 66 of the housing 70 to join the lower extremity of the second panel portion 86. The third panel portion 88 is connected to the second panel portion 86 at its upper extremity. The third panel portion 88 extends upwardly toward the top panel 72 in the direction of the second end 68 of the housing 70. The first, second and third panel portions 84, 86 and 88 co-operate with each other define a protrusion or bulge 89 in the housing 70. The fourth panel portion 90 runs from the upper end of the third panel portion 88 until it meets the lower extremity of the fifth panel portion 92. At its upper extremity, the fifth panel portion 92 joins the top panel 72.

The second panel 78 includes three panel portions—a first downwardly sloped panel portion 94, a second vertically extending panel portion 96 and a third downwardly sloped panel portion 98. The first panel portion 94 is joined to one end of the top panel 72 and extends downwardly and toward the second end 68 to connect to the upper end of the second panel portion 96. The second panel portion 96 is joined to the third panel portion 98 by a relatively short horizontal shoulder portion 100. The third panel portion 98 extends downwardly and toward the first end 66 of the housing 70 until it meets with the bottom panel 74.

A portion of the second panel 78 defines a movable door panel 102 hingedly connected to the top panel 72. The door panel 102 is movable between an open position 104 (shown in FIG. 1) which permits a formed bale to be released from within the bale forming assembly 36 and closed position 106 (shown in FIG. 3).

The bottom panel 74 includes two panel positions—a first substantially horizontal panel portion 101 and a second inclined panel portion 103. The first horizontal panel portion 101 is mounted on the frame 33, and extends from the third panel portion 98 of the second panel 78 until roughly midway of the housing 70 to connect the second inclined panel portion 103. The second inclined panel portion extends upwardly and towards the first end 66 of the housing 68 to join to the first panel portion 84 of the first panel 76.

The chipper assembly 34 is disposed generally perpendicular to the bale forming assembly 36 and is joined thereto along the sidewall 80. More specifically, the walls of the second feeder passageway 64 are connected to the sidewall 80 with the passageway 64 in alignment with a cutout 108 defined in the sidewall 80. During operation of the chipping and bale forming apparatus 20, wood chips from the second passageway 64 are urged to enter into the bale forming assembly 36 through the cutout 108. While in this embodiment, the cutout 108 (visible in FIG. 3) is square, it should be appreciated that, in other embodiments, the cutout could be shaped differently.

Unlike conventional bale forming machines wherein the material to be baled is fed into the machine from its front longitudinal end (that is, that machine is front loaded), because the bale forming assembly 36 is oriented generally perpendicular to the chipper assembly 34 (and to the direction of rolling travel), it instead receives wood chips from the side. Stated differently, the wood chips are side-loaded into the bale forming assembly 36. The side-loading of the wood chips into the bale forming assembly 36 tends to be advantageous because it obviates the need to disconnect the chipping and bale forming apparatus 20 from the towing vehicle when the bale is released from the bale forming assembly 36, which would otherwise have been required had the bale forming assembly been configured for front-loading without any further modifications.

While it is preferred that the bale forming assembly be configured for side-loading for the reasons stated above, it will be appreciated that this need not be the case in every application. In other embodiments, the drawbacks described above could be overcome, for example, by extending the frame on which the bale forming assembly is supported to create a ramp for unloading the formed bales. The ramp could be configured as not to require the decoupling of the chipping and bale forming apparatus from the towing vehicle.

The housing 70 of the bale forming assembly 36 has an interior chamber 120 defined between the top and bottom panels 72 and 74, the first and second panels 76 and 78, and the sidewalls 80 and 82. Disposed within the interior chamber 120 is a baling mechanism 122 of the type generally known in the art such that only a high-level description is required for the purposes of illustrating the principles of the invention as applied to this embodiment. Shown conceptually in FIGS. 2 and 3, the baling mechanism 122 includes first and second chain and slat conveyor assemblies 124 and 126. Each conveyor assembly 124, 126 employs a pair of endless drive chains 132 configured for continued rotation and a plurality of guide rollers 134 having drive sprockets (not shown) engageable with the drive chains 132. In the case of each conveyor assembly 124, 126, one drive chain 132 of the pair is positioned adjacent the sidewall 80 of the housing 70 while the other drive chain 132 of the pair is positioned adjacent the opposite sidewall 82.

In each conveyor assembly 124 and 126, some of the guide rollers 134 are fixed and others are movable. In the first conveyor assembly 124, the plurality of guide rollers 134 includes five guide rollers—first, second, third, fourth and fifth guide rollers 140, 142, 144, 146 and 148, respectively. In this embodiment, the first, second, third, and fourth guide rollers 140, 142, 144 and 146 are fixed while the fifth guide roller 148 is movable relative to the others. In the second conveyor assembly 126 seven guide rollers are used—first, second, third, fourth, fifth, sixth and seventh 150, 152, 154, 156, 158, 160 and 162 guide rollers. In present embodiment, the third and seventh guide roller 154 and 162 are movable while the remaining guide rollers 150, 152, 156, 158 and 160 are stationary. Hydraulic pistons (not shown) are used to move the movable guide rollers 148, 154 and 162. In alternative embodiments, a different number of guide rollers (fixed and/or movable) could be used for either or both of the conveyor assemblies 124 and 126.

A plurality of transverse, spaced apart and generally parallel, slats 164 are supported between each pair of drive chains 132. The spacing between the slats 164 is selected to ensure that wood chips of a desired size are maintained within the compaction chamber 166 defined in the variable-sized space bounded by the first and second conveyor assemblies 124 and 126. In this embodiment, the slats 164 have a generally circular cross section. In other embodiments, the bale forming apparatus could be configured with belts instead of slats. In yet a further alternative embodiment, the conveyor assemblies of the bale forming assembly 36 could use different linkages or could be apron chain-type conveyors with overlapping or interlocking plates or the like forming a continuous moving bed when actuated. Other modifications are also possible.

The mechanism 122 is also provided with an assembly (not shown) for wrapping the outer surface of the bale 170 with twine, net wrap, or the like to thereby preserve the structural integrity of the bale 170 and protect the bale 170 from the elements.

In operation, wood chips 172 are discharged into the interior chamber 120 through the cutout 108 formed in the sidewall 80, where they are acted upon by the slats 164 as the drive chains 132 travel over the guide rollers 134. The gripping action of the slats 164 pulls the wood chips 172 as they are rotated within the compaction chamber 166. The compaction of the wood chips during rotation, results in the creation of a bale core which grows as more wood chips are fed into the compaction chamber 166. The movable guide rollers 148, 154 and 162 allow the arrangement of the drive chains 132 and slats 164 to be reconfigured so as to adjust to shape of the increasingly large core. When the core has reached the desired size, the bale 170 is wrapped and then released from the compaction chamber 166 and exits the bale forming assembly 36 through the opening 168 formed by moving the door panel 102 to its open position 104.

An exemplary use of the chipping and bale forming apparatus 20 is now described in greater detail with reference to FIGS. 1, 2 and 3. The trimmed branches, brush, tree parts or other materials to be chipped (shown conceptually as an amorphous mass in FIG. 2 and designated generally with reference numeral 180) are loaded into the hopper 42 and urged toward the first feeder passageway 52. The chipping mechanism 54 is then actuated causing the first and second chipper rollers 60 and 62 to rotate in opposite directions. The counter-rotation of the chipper rollers 60 and 62 causes the material to be chipped 180 to be drawn into the chipping mechanisms 54 whereat it can be acted upon by the chipper rollers 60 and 62 and reduced to wood chips 172.

The wood chips 172 produced are propelled forward through the second feeder passageway 64 and the cutout 108, and into the interior of housing 70.

Once in the compaction chamber 166, the wood chips 172 are acted upon by the first and second conveyor assemblies 124 and 126 of the baling mechanisms 122. AS the drive chains 132 travel over the guide rollers 134, the slats 164 grip the wood chips 172 compacting them as they rotate to from the core of the bale 170. When the core has reached the desired size, the bale 170 is wrapped. Thereafter, the door panel 102 of the bale forming assembly 36 moves to its open position 104 (see FIG. 1) to allow the bale 170 to be ejected from the compaction chamber 166. When a sufficient number of bales 170 have been formed, a vehicle such as a flat bed vehicle (not shown) may be dispatched to the site for the collection of the bales 170. Alternatively, the flat bed vehicle may already be on site. The bales 170 could then be stacked with the aid of lifting machinery (for example, a grappling arm assembly) onto the flat bed of the vehicle for transport to a storage facility or other facility for immediate use.

By baling the wood chips in accordance with the principles of the present invention, the collection, storage and transport of wood chips is facilitated while not substantially altering the physical properties of the wood chips. As a result, wood chips would have otherwise been disposed in a landfill can now be put to good use as filler or it could be used as fuel. Baled wood chips could become a commodity much like recycled newspaper print.

In the embodiment described above the bale forming assembly 36 is configured to form round bales of wood chips. It should be appreciated that the application of the principles of the present invention is not limited to the formation of round bales. In other embodiments, square or differently shaped bales may be formed. In such cases, the bale forming assembly would be adapted accordingly.

While in the preferred embodiment, the chipping and bale forming apparatus 20 is used to reduce trimmed branches from pruning operations to wood chips and then form bales from the resulting wood chips, it will be appreciated that the chipping and bale forming apparatus 20 may also successfully be used in other applications and in respect of other material(s) to be chipped to produce chips and form bales therefrom. For instance, in another application, it may be possible to feed waste plastics (such as discarded plastic water bottles) into an appropriately modified chipping and bale forming apparatus. The apparatus would reduce the plastic water bottles into chips and such chips would be baled for ease of transport. The bales of plastic chips could then be provided to a plastics recycler for reuse.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. An apparatus for reducing trimmed branches or tree parts to wood chips and for forming a bale from the wood chips produced, the apparatus comprising:
   a chipper assembly having a pair of counter-rotating chipper rollers operable to reduce the trimmed branches to wood chips and to propel said wood chips directly into a bale forming assembly;
   said bale forming assembly operatively connected to the chipper assembly, the bale forming assembly having a housing and a baling mechanism contained within an interior space of the housing, the housing having an opening defined therein for receiving wood chips from the chipper assembly, said opening being oriented in a plane that is in generally perpendicular relation to said first direction in order to receive said wood chips being propelled in said first direction by said chipping mechanism, the opening providing access to the interior space of the housing; the baling mechanism being operable to form a bale from the wood chips produced by the chipper assembly; and whereby a propulsive force generated by the chipping mechanism propels the wood chips directly from the chipper assembly into the housing of the bale forming assembly.

2. A method for reducing trimmed branches or tree parts to wood chips and for forming a bale from the wood chips produced, the method comprising:

providing a chipper assembly having a chipping mechanism comprising two counter-rotating chipper rollers operable to reduce the trimmed branches to wood chips and to propel said wood chips in a specific direction when said wood chips are ejected from said chipper assembly;

providing a bale forming assembly directly adjacent and operatively connected to the chipper assembly, the bale forming assembly having a housing and a baling mechanism contained within an interior space of the housing, the housing having an opening directly adjacent to the chipper assembly and defined therein for receiving chips from the chipper assembly, the opening providing access to the interior space of the housing, the baling mechanism being operable to form a bale from the chips produced by the chipper assembly;

feeding the trimmed branches into the chipping mechanism;

urging the chipping mechanism to act upon the trimmed branches so as to reduce the trimmed branches to wood chips and to propel said wood chips directly into said baling mechanism;

discharging the wood chips produced from the chipping mechanism and conveying the wood chips into the interior space of the housing; and urging the baling mechanism to act upon the wood chips so as to form a bale from the wood chips.

3. A method for reducing material to chips and for forming a bale from the chips produced, the method comprising:

providing a chipper assembly having a chipping mechanism comprising a pair of counter-rotating chipper rollers operable to reduce the material to chips while simultaneously discharging said chips in a specific direction;

providing a bale forming assembly operatively connected to the chipper assembly, whereby the chipper assembly is disposed generally perpendicular to the bale forming assembly and joined thereto along a sidewall such that the bale forming assembly is disposed perpendicular to the direction of rolling travel, the bale forming assembly having a housing and a baling mechanism contained within an interior space of the housing, the housing having an opening defined therein for receiving chips from the chipper assembly, the opening providing access to the interior space of the housing, the baling mechanism being operable to form a bale from the chips produced by the chipper assembly;

feeding the material to be reduced into the chipping mechanism;

urging the chipping mechanism to act upon the material to reduce the material to chips and simultaneously propel said chips into the interior space of said housing;

urging the baling mechanism to act upon the chips so as to form a bale from the chips.

* * * * *